United States Patent
Ho et al.

(10) Patent No.: US 7,505,219 B2
(45) Date of Patent: Mar. 17, 2009

(54) MULTI-STAGE LENS DRIVING DEVICE

(75) Inventors: Wen Jen Ho, Shalu Township, Taichung County (TW); Chi Lone Chang, Jhudong Township, Hsinchu County (TW); Heng I Yu, Taichung (TW)

(73) Assignee: PowerGate Optical Inc., Zhubei (TW)

( * ) Notice: Subject to any disclaimer, the term of this patent is extended or adjusted under 35 U.S.C. 154(b) by 0 days.

(21) Appl. No.: 11/653,428

(22) Filed: Jan. 16, 2007

(65) Prior Publication Data
US 2007/0247539 A1 Oct. 25, 2007

(30) Foreign Application Priority Data
Jan. 20, 2006 (TW) .............. 95102163 A
Jul. 11, 2006 (TW) .............. 95212139 U (51) Int. Cl.
*G02B 7/02* (2006.01)
(52) U.S. Cl. .................... 359/824; 359/811
(58) Field of Classification Search ......... 359/819–824, 359/694–703
See application file for complete search history.

(56) References Cited

U.S. PATENT DOCUMENTS

| | | | | |
|---|---|---|---|---|
| 5,939,804 A | * | 8/1999 | Nakao et al. | 310/12 |
| 7,158,316 B2 | * | 1/2007 | Chang et al. | 359/698 |
| 7,206,145 B2 | * | 4/2007 | Otaka et al. | 359/824 |
| 2007/0046109 A1 | * | 3/2007 | Ho et al. | 310/12 |

* cited by examiner

*Primary Examiner*—Mohammed Hasan
(74) *Attorney, Agent, or Firm*—Troxell Law Office PLLC (57) ABSTRACT

A multi-stage lens driving device comprises a lens holder, a lens mounted on the lens holder, a carriage carrying the lens holder in a movable manner, at least one magnet coupled to the lens holder, at least one coil disposed on the carriage and corresponding to the magnet, and at least one yoke disposed at a predefined position of the carriage. Through the magnetic field produced by the magnet and the current action in the coil, the force generated thereof can push the lens holder to move toward a desired position, thereby achieving the effect of focusing or zooming. In addition, through the attraction between the yoke and the magnet on the lens holder, the lens holder may be secured to the predefined position. That is, the lens is firmly secured even when the coil current is shut off, thereby achieving the goal of saving power consumption.

15 Claims, 14 Drawing Sheets

MULTI-STAGE LENS DRIVING DEVICE

BACKGROUND OF INVENTION

1. Field of the Invention

The present invention relates to a multi-stage lens driving device, more particularly a miniature lens driving device that uses electromagnetic driving apparatus as power source to drive a miniature lens to engage in multi-stage position switch.

2. Description of the Prior Art

Figure 1:
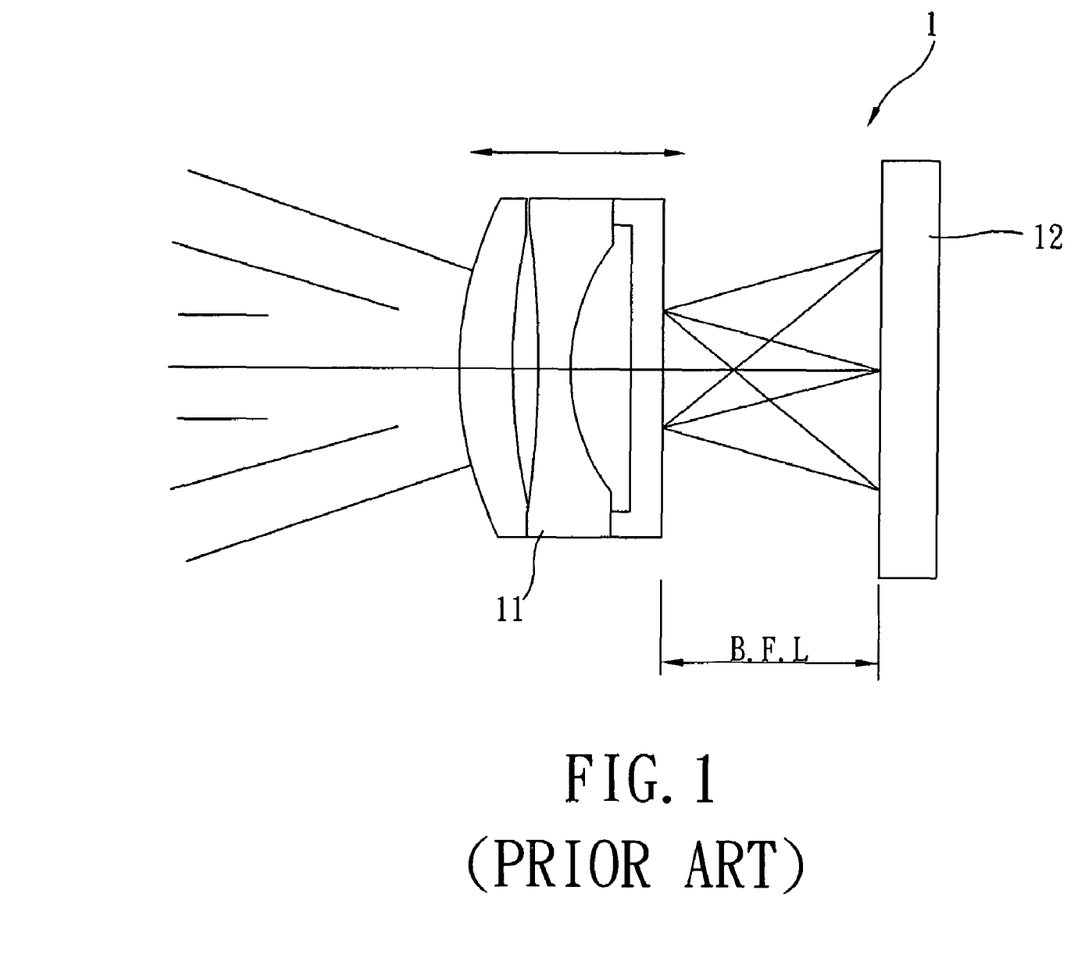
FIG. 1 is a diagram showing the focusing principle of conventional lens.

As shown in FIG. 1, a standard camera 1 comprises a lens set 11 and a sensor 12. The lens set 11 forms an image on sensor 12 by refracting the light rays from an object. If the distance between lens set 11 and sensor 12 is fixed (i.e. a fixed lens), the lens can only show clearly objects at its hyperfocal distance of 2-3 meters away. For the camera to shoot objects clearly at varying distances (for example at a close distance), a lens driving device is required to move the lens set, thereby adjusting the distance between lens set and sensor and achieving focusing.

When the lens set offers the zoom function, the multiple lenses in the lens set must be displaced in coordination with the change of zoom power. Thus the lens module is typically designed with a driving apparatus to displace the lenses.

The focusing or zooming mechanism for a conventional multi-stage camera lens moves the lens "manually", which can be inconvenient at times. The present invention improves the aforesaid drawback by changing the lens driving method from manual to electromagnetic, and at the same time, reduce the size of lens driving device and simplify the design of lens module, hence lowering production costs and improving the assembly process. Such miniature lens driving device will be suitable for the camera module in cellular phone, notebook computer and PDA.

U.S. Pat. Nos. 5,150,260, 6,392,827, 5,220,461 and 5,471,100 have disclosed several techniques for driving lens, which however do not bear identical nor similar technical features as the ones disclosed in the present invention.

SUMMARY OF INVENTION

The primary object of the present invention is to provide a miniature multi-stage lens driving device, which offers the advantages of smaller size, simpler mechanism and less power consumption and drives lens (lens unit) electromagnetically to achieve the effect of multi-stage focusing or zooming, thereby improving the function of miniature camera module.

Another object of the present invention is to provide a multi-stage lens driving device, which is able to secure the lens holder to a specific position by the attraction between the magnetic conductors (yokes) disposed on carriage and base and the magnetic element (permanent magnet) disposed on lens holder. As such, the lens is firmly secured even with the coil current shut off to save power consumption.

To achieve the aforesaid objects, a preferred embodiment of the multi-stage lens driving device according to the invention comprises a lens holder, a lens mounted on the lens holder, a carriage carrying the lens holder by means of mutual displacement, at least a magnet connected to the lens holder, at least a coil provided on the carriage and corresponding to the magnet, and at least two yokes disposed respectively at a predetermined location on the anterior and posterior sides of lens holder. Through the magnetic field produced by the magnet and the electric current action in the coil, the force generated thereof can push the lens holder to bring the lens to a desired position, thereby achieving the effect of focusing or zooming. In addition, through the attraction between the yokes at the anterior and posterior ends of lens holder and the magnet on the lens holder, the lens holder may be secured to a specific position. That is, the lens is firmly secured with the coil current shut off, thereby achieving the goal of saving power consumption.

In one preferred embodiment of the present invention, two cone-shape inclined planes are formed at the anterior and posterior periphery of holder along axial direction. In addition, two beveled surfaces are disposed respectively on the carriage and corresponding respectively to the two cone-shape inclined planes. When the holder is driven to move along axial direction, the beveled surfaces disposed on carriage can prop against the cone-shape inclined planes on holder to achieve the positioning effect. Furthermore, the support of the cone-shape inclined planes on holder and the beveled surfaces on carriage for each other allows the center line of lens to overlap the axial direction so lens will not shift.

In one preferred embodiment of the present invention, the magnet is produced by polarizing a lodestone such that the upper and lower portions of the lodestone on the same side have opposite polarity, and as such, the upper and lower portions of magnet on the side facing the carriage have opposite polarity.

In one preferred embodiment of the present invention, the coils are flat coils further comprising a substrate made of dielectric material and a metal coil printed thereon. The substrate is a rectangular sheet and the metal coil is spirally wound on a surface of substrate in the shape of a rectangular vortex.

In another preferred embodiment of the present invention, the coil comprises at least two inductive coils wound respectively around the outer periphery of carriage and corresponding respectively to the upper and lower portions of magnet. At the same time, the currents applied to the two inductive coils are in opposite direction.

BRIEF DESCRIPTION OF THE DRAWINGS

For further understanding the objects, the characteristics, and the functions of the structures of the present invention, a detailed description matched with corresponding drawings are presented as follows.

DETAILED DESCRIPTION

Figure 2:
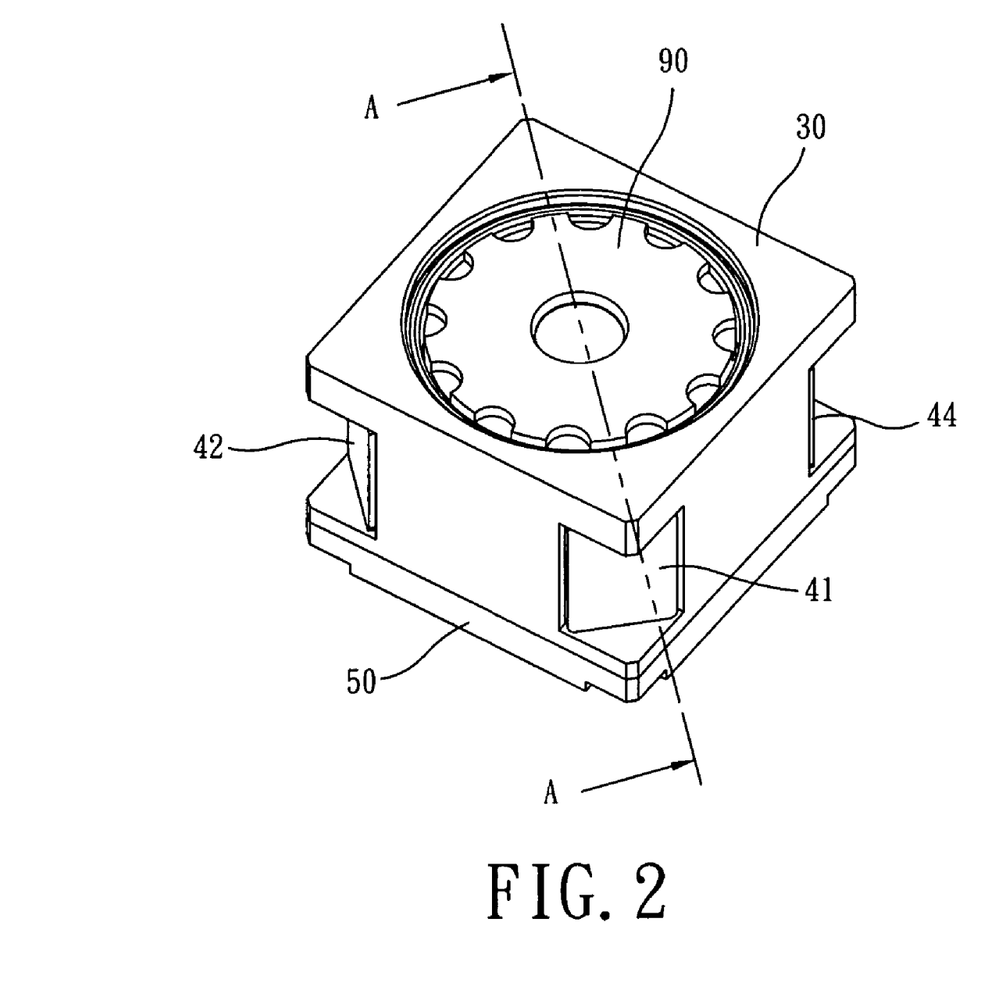
FIG. 2 is an external view of the assembled multi-stage lens driving device according to a first embodiment of the invention.
Figure 3:
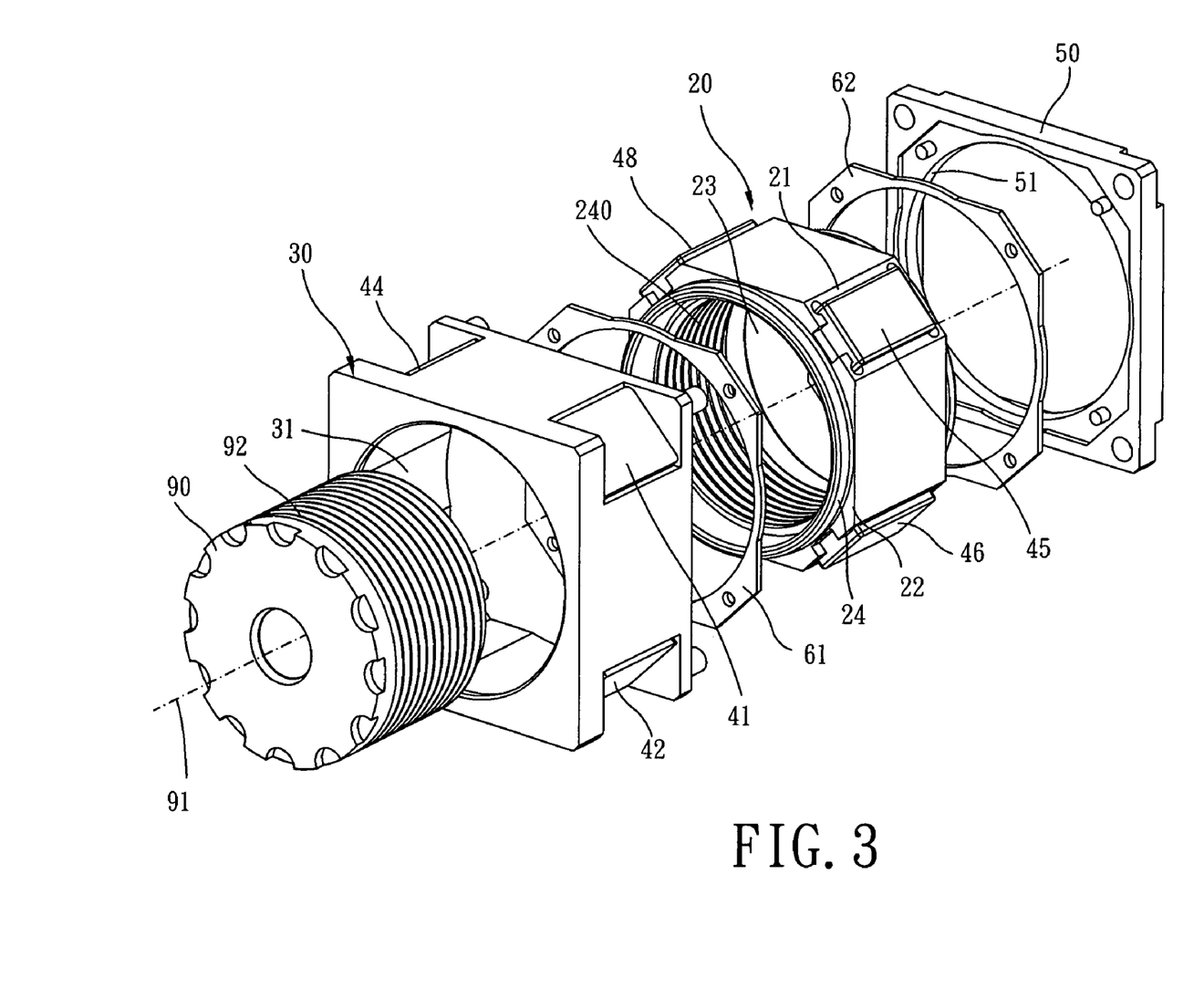
FIG. 3 is an exploded front side view of the multi-stage lens driving device according to the first embodiment of the invention.
Figure 4:
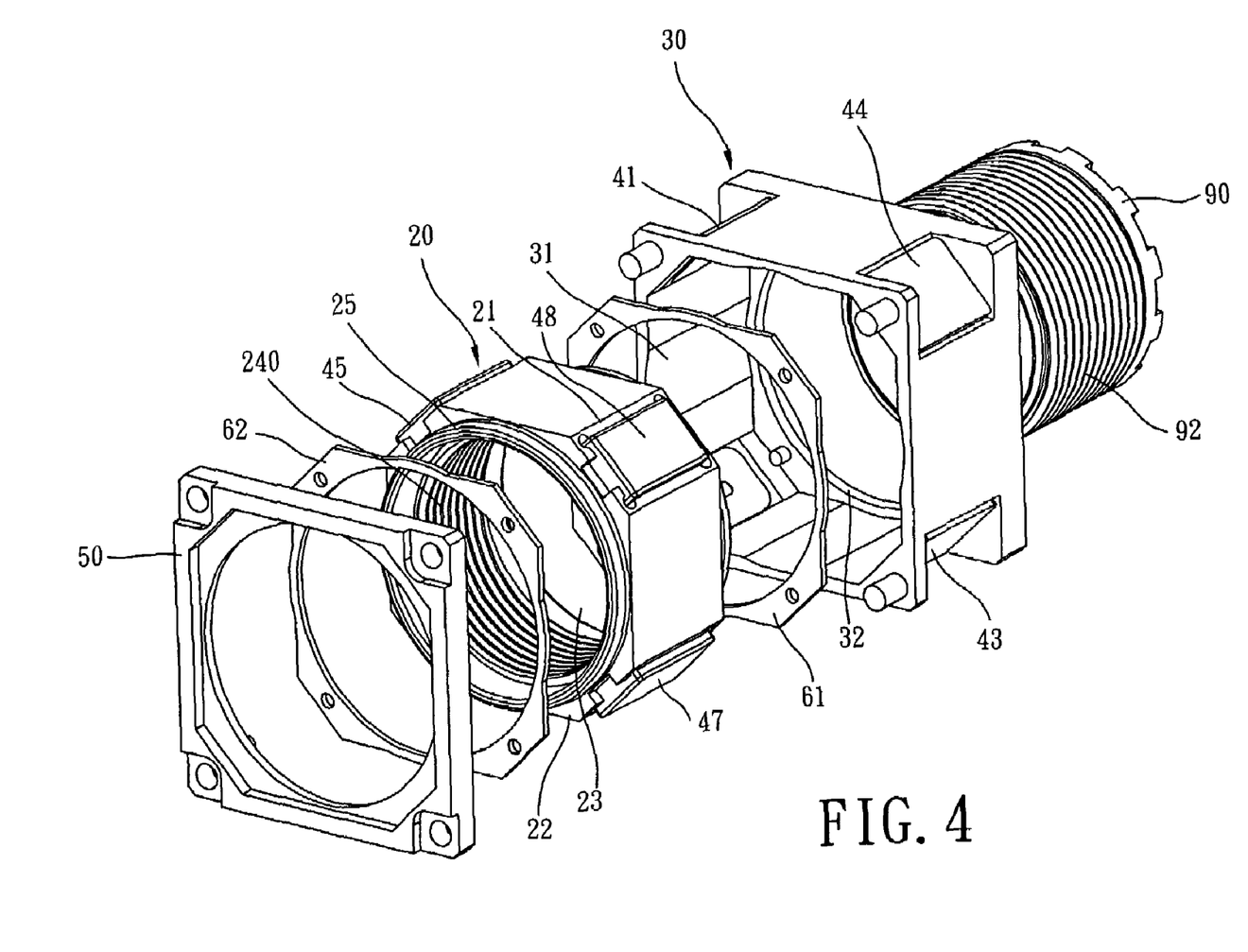
FIG. 4 is an exploded back side view of the multi-stage lens driving device according to the first embodiment of the invention.
Figure 5:
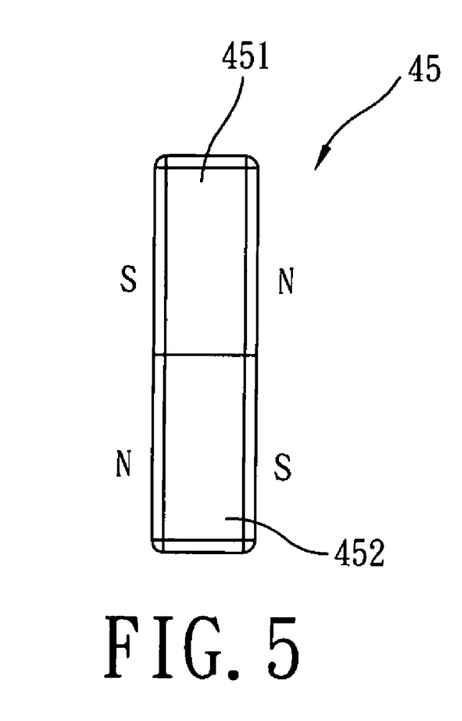
FIG. 5 is a diagram showing a preferred embodiment of the magnet in the multi-stage lens driving device according to the invention.
Figure 6:
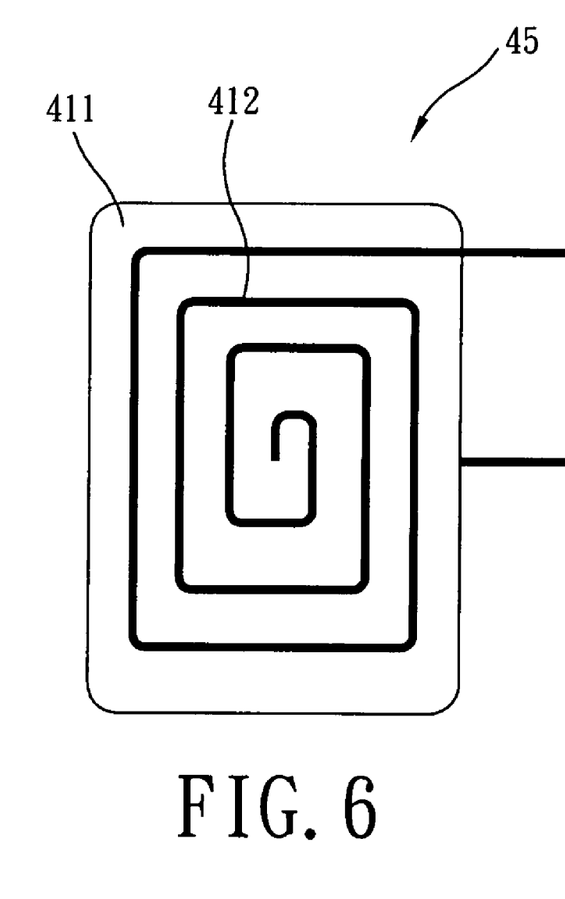
FIG. 6 is a diagram showing the first preferred embodiment of the coil in the multi-stage lens driving device according to the invention.
Figure 7:
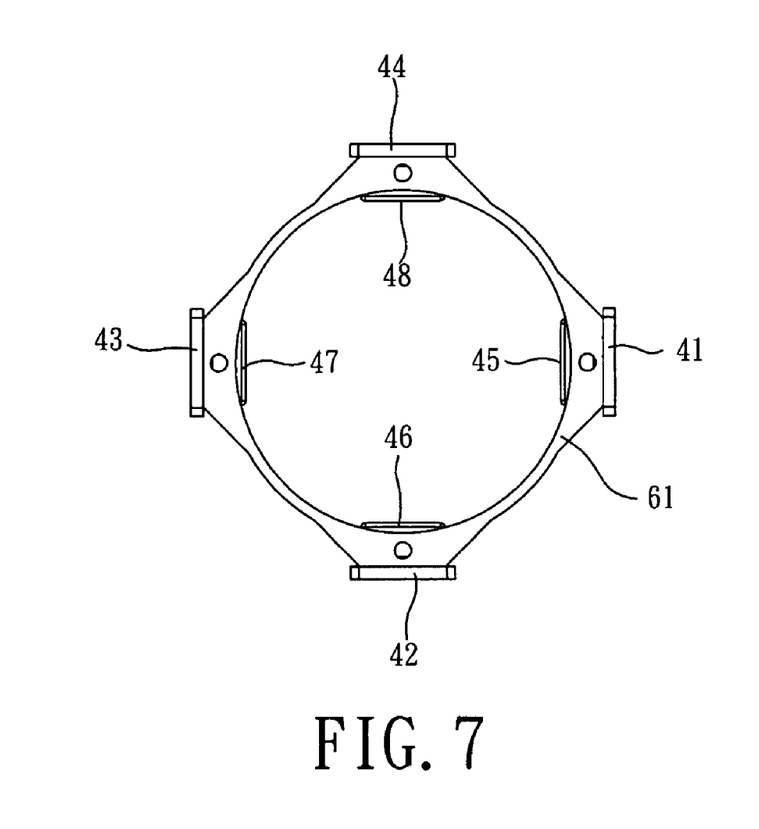
FIG. 7 is a diagram showing the relative positions of yoke, coil and magnet in the multi-stage lens driving device according to the first embodiment of the invention.
Figure 8:
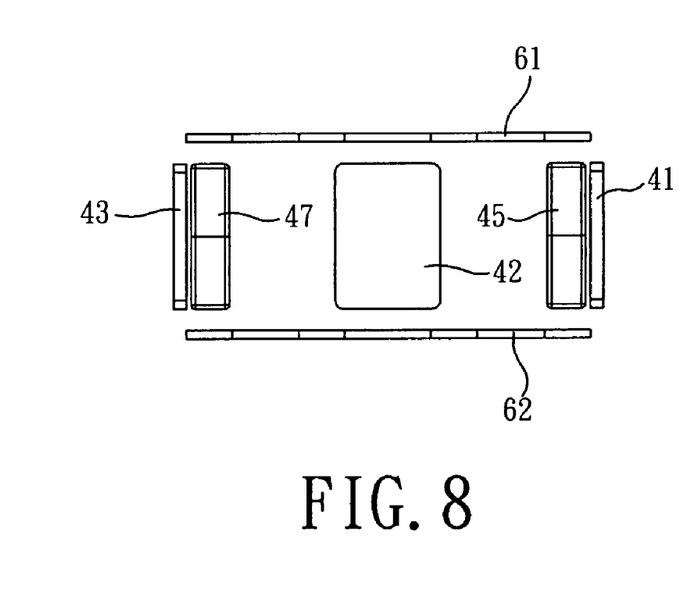
FIG. 8 is a diagram of the relative positions shown in FIG. 7 from a side view.
Figure 9:
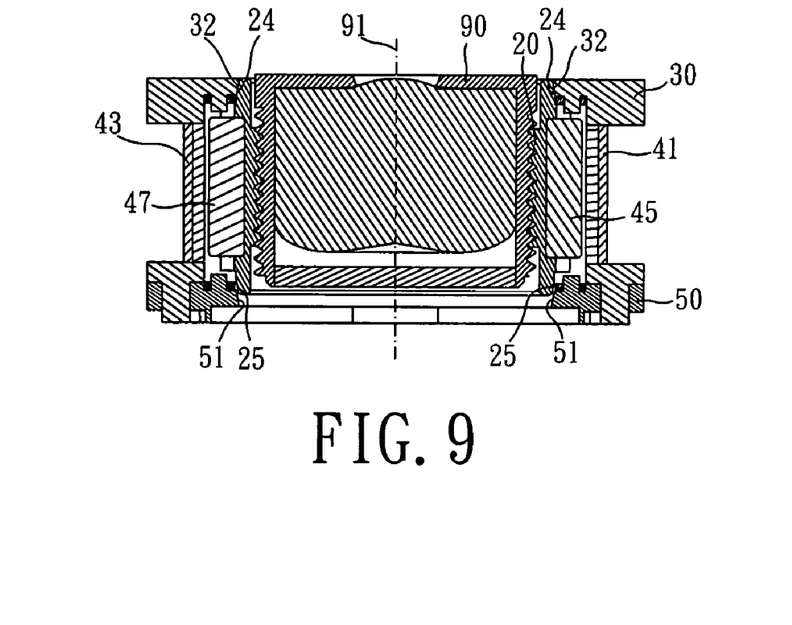
FIG. 9 is the A-A sectional view of the multi-stage lens driving device shown in FIG. 2 with the lens at the first position.
Figure 10:
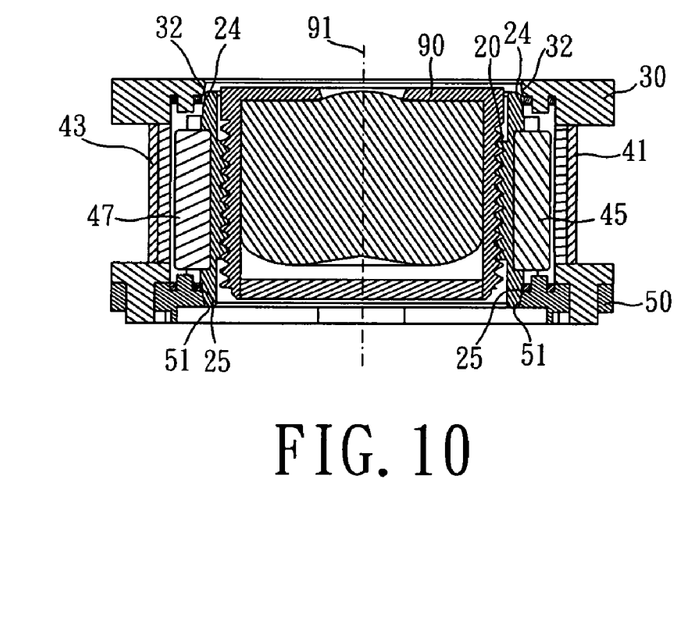
FIG. 10 is the A-A sectional view of the multi-stage lens driving device shown in FIG. 2 with the lens at a second position.

FIGS. 2~10 disclose a first preferred embodiment of the multi-stage lens driving device according to the invention. FIG. 2 is an external view of the assembled multi-stage lens driving device according to a first embodiment of the invention. FIG. 3 is an exploded front side view of the multi-stage lens driving device according to a first embodiment of the invention. FIG. 4 is an exploded back side view of the multi-stage lens driving device according to a first embodiment of the invention. FIG. 5 is a diagram showing a preferred embodiment of the magnet in the multi-stage lens driving device according to the invention. FIG. 6 is a diagram showing a first preferred embodiment of the coil in the multi-stage lens driving device according to the invention. FIG. 7 is a diagram showing the relative positions of yoke, coil and magnet in the multi-stage lens driving device according to the invention from an anterior view. FIG. 8 is a diagram of the relative positions shown in FIG. 7 from a side view. FIG. 9 is the A-A sectional view of the multi-stage lens driving device shown in FIG. 2 with the lens at a first position. FIG. 10 is the A-A sectional view of the multi-stage lens driving device shown in FIG. 2 with the lens at a second position.

As shown in FIGS. 2~4, the multi-stage lens driving device according to a first preferred embodiment of the invention comprises: a lens 90, a lens holder 20, a carriage 30, a base 40, an electromagnetic driving mechanism, and a positioning mechanism.

The lens 90 is defined with an axial direction 91, along which the lens gathers light. In the first preferred embodiment of the invention, the lens 90 can be a lens module composed of monofocal lenses without zoom function or a lens 90 in a zoom lens unit.

The lens holder 20 has a hollow annular structure having an outer ring surface 21. The outer edge contour 22 of the axial projection 91 of holder 20 exhibits a polygonal structure. The holder 20 has an axial through-hole 23. Corresponding threads 240, 92 are disposed between the through-hole 23 and lens 90 to engage, hold and secure lens 90 in the through-hole 23 of holder 20.

The holder 20 can become disposed inside the carriage 30 by means of relative movement that enables the holder 20 to carry out linear displacement inside the carriage 30 along axial direction 91. In the first preferred embodiment, the carriage 30 has a hollow structure and a polygonal inner edge contour 31 of its axial projection 91 corresponds exactly to the polygonal outer edge contour 22 of holder 20. When holder 20 is held inside the carriage 30, the matching of their inner and outer polygonal contours 31, 22 form essentially a linear guiding mechanism that allows the holder 20 to engage in linear movement therein without turning.

The electromagnetic driving mechanism is linked to the holder 20 to drive the holder 20 to engage in anterior-posterior linear movement along axial direction 91 in the carriage 30. In the first preferred embodiment, the electromagnetic driving mechanism comprises: at least a coil 41, 42, 43, 44 and at least a magnet 45, 46, 47, 48. In this embodiment, the numbers of both coil and magnets are four, but other numbers are acceptable. The magnets 45, 46, 47, 48 are spaced in roughly equal distance apart and mounted on the outer ring surface 21 of holder 20. The coils 41, 42, 43, 44 are furnished on the carriage 30 and correspond (without direct contact) respectively to the positions of magnets 45, 46, 47, 48. By applying current of predefined direction to coils 41, 42, 43, 44, predetermined interacting force is produced between the coils and magnets 45, 46, 47, 48 which can push the holder 20 to move.

As shown in FIG. 5, the magnets 45, 46, 47, 48 are permanent magnets. In the example of magnet 45, it is produced by polarizing a lodestone such that the upper and lower portions 451, 452 of the lodestone on the same side have the opposite polarity. For example, the upper portion 451 on the side surface of magnet 45 facing the carriage 30 is N pole, while its lower portion 452 is S pole. In contrast, the upper portion 451 on the side surface of magnet 45 adjoining the outer ring surface 21 of holder 20 is S pole, while its lower portion 452 is N pole.

In another embodiment, two permanent magnets 451, 452 are stacked together to form a magnet set where both magnets have two opposing poles. In the magnets 451, 452, one pole (e.g. S pole of magnet 451 and N pole of magnet 452) is on the side adjoining outer ring surface 21, while the other pole (e.g. N pole of magnet 451 and S pole of magnet 452) is situated on the side facing the carriage 30. The poles of stacked magnets 451, 452 on the side facing the carriage 30 (e.g. N pole of magnet 451 and S pole of magnet 452) are opposite to each other.

As shown in FIG. 6, the coils 41, 42, 43, 44 in the first preferred embodiment are all flat coils. In the example of coil 41, it further comprises: a substrate 411 made of dielectric material and a metal coil 412 printed on the substrate. The substrate 411 is a rectangular sheet made of dielectric material. Its size roughly corresponds to magnet 45 with opposing poles at upper and lower portions 451, 452. The metal coil 412 is spirally wound on a surface of substrate 411 in the shape of a rectangular vortex. When a current (direct current) of predefined direction is applied to flat coil 41, the current direction at upper half of coil 41 is exactly opposite to that at lower half of coil 41. Such arrangement coordinates with the property of magnet 45 having opposite polarity at its upper and lower portions 451, 452. As the upper and lower halves of flat coil 41 provides same-direction thrust to upper and lower portions 451, 452 of magnet 45, they provide essentially nearly two times the thrust force, thereby greatly enhancing the driving performance.

The positioning mechanism is mounted on carriage 30 and base 50 to guide the holder 20 to either a first position (anterior position) or a second position (posterior position) when it displaces in axial direction 91. As shown in FIGS. 3 & 4, the positioning mechanism in the first preferred embodiment of the invention comprises: at least two magnetic conductors 61, 62 respectively near to two cone-shape inclined planes 24, 25 at the anterior and posterior periphery of holder 20 in axial direction, and two beveled surfaces 32, 51 corresponding respectively to the two cone-shape inclined planes 24, 25.

Referring to FIGS. 7 & 8 together with 3 & 4, the two magnetic conductors 61, 62 are flat ring structures made of yoke. One of the magnetic conductors 61 (yoke) is mounted on the inner periphery at the anterior side of carriage 30 facing the holder 20 such that the magnetic conductor 61 (yoke) is essentially situated at the anterior end of holder 20 (the first position) along axial direction 91. The other magnetic conductor 62 (yoke) is mounted on the inner periphery of base 50 facing the holder 20, i.e. the posterior end of holder 20 along axial direction 91 (the second position). As shown in FIG. 9 together with FIG. 8, when holder 20 is driven by the electromagnetic driving mechanism (including magnets 45~48 and coils 41~44) to move to a place near the magnetic conductor 61 at anterior end, the magnets 45~48 disposed on the holder 20 will be attracted and positioned at the first position where magnetic conductor 61 at anterior end of holder 20 is located. As shown in FIG. 10 together with FIG. 8, when current of opposite direction is applied to coils 41~44, the holder 20 is driven by inverse thrust force and moves to a place near the magnetic conductor 62 at the posterior end. As magnets 45~48 are attracted by magnetic conductor 62, the holder 20 is positioned at the second position at posterior end. As such, multi-stage switching of lens position is achieved. In addition, through the attraction between magnetic conductors 61, 62 and magnets 45~48, the lens 90 is firmly secured to its place even with the current applied to coils 41~44 shut off, thereby saving the power consumption.

As shown in FIGS. 9 & 10 and together with FIGS. 3 & 4, with two cone-shape inclined planes 24, 25 provided at the anterior and posterior periphery of holder 20 along axial direction 91 and two beveled surfaces 32, 51 disposed respectively on carriage 30 and base 50, and corresponding respectively to the two cone-shape inclined planes 24, 25, when holder 20 is driven to move along axial direction 91 to first position or second position, the beveled surfaces 32, 51 disposed on carriage 30 and base 50 can prop against the cone-shape inclined planes 24, 25 on holder 20 to achieve the positioning effect. In addition, the support of the cone-shape inclined planes 24, 25 on holder 20 and the beveled surfaces 32, 51 for each other allows the center line of lens 90 to overlap the axial direction 91 so lens 90 will not shift.

Figure 11:
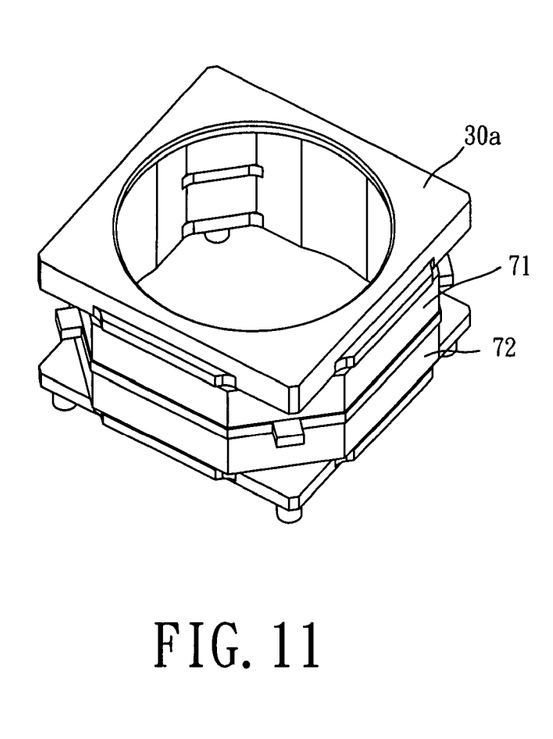
FIG. 11 is diagram showing the second preferred embodiment of the coil in the multi-stage lens driving device according to the invention.

Referring to FIG. 11 which shows a second preferred embodiment of the coil in the multi-stage lens driving device according to the invention, the coil comprises at least two inductive coils 71, 72 which are wound respectively around the outer periphery of carriage 30a and correspond to the upper and lower portions 451, 452 of magnet 45. At the same time, the currents applied to inductive coils 71, 72 are in opposite direction (the same effect may be achieved by winding the inductive coils 71, 72 in opposite direction). As such, it coordinates with the property of magnet 45~48 having opposite polarity at its upper and lower portions 451, 452. As the inductive coils 71, 72 provide same-direction thrust to upper and lower portions 451, 452 of magnet 45~48, they provide essentially nearly two times the thrust force, thereby greatly enhancing the driving performance.

Figure 12:
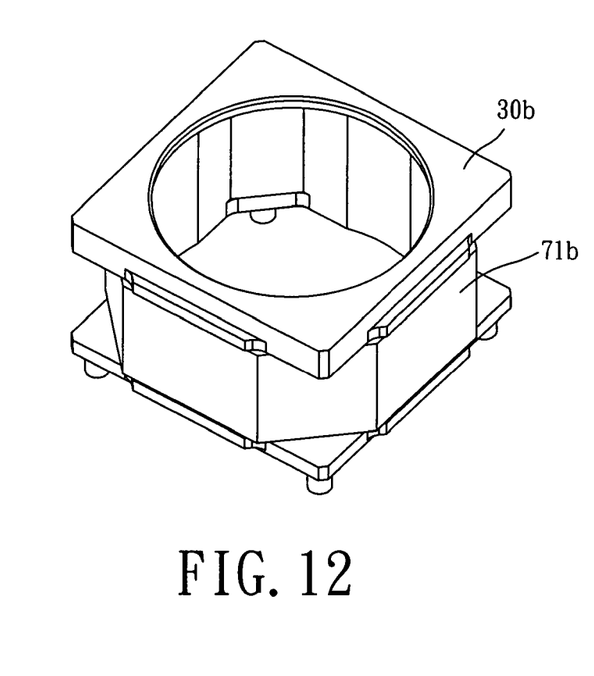
FIG. 12 is diagram showing a third preferred embodiment of the coil in the multi-stage lens driving device according to the invention.
Figure 13:
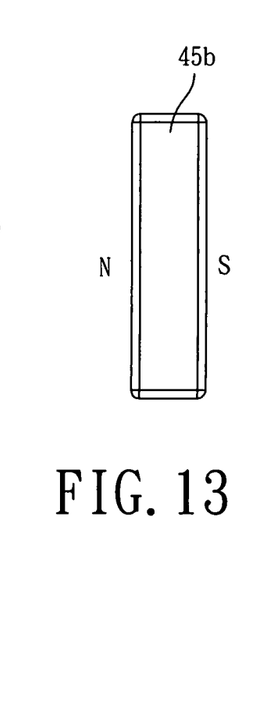
FIG. 13 is diagram showing the third preferred embodiment of the magnet in the multi-stage lens driving device according to the invention.

FIG. 12 and FIG. 13 show respectively the diagram of a third preferred embodiment of the coil and the magnet in the multi-stage lens driving device according to the invention. As shown, the coil is composed of only one inductive coil 71b which is wound around the outer periphery of carriage 30b in a predetermined direction. The magnet 45b is a monopole lodestone with a polarity (S pole in FIG. 13) on the side surface facing the carriage 30b and opposite to the polarity (N pole in FIG. 13) on the side surface adjoining the outer ring surface (not numbered in the figure) of holder 20. Such arrangement still achieves the effect of driving the holder and causing it to displace.

Figure 14:
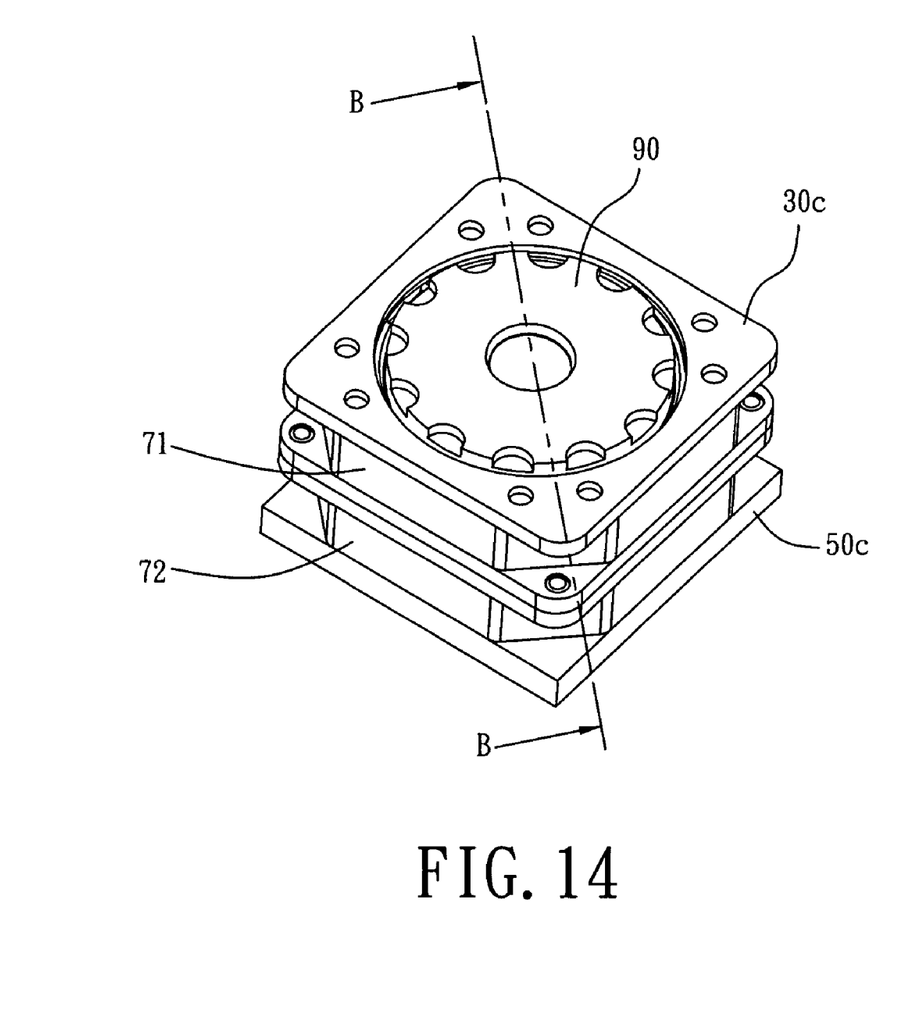
FIG. 14 is an external view of the assembled multi-stage lens driving device according to a fourth embodiment of the invention.
Figure 15:
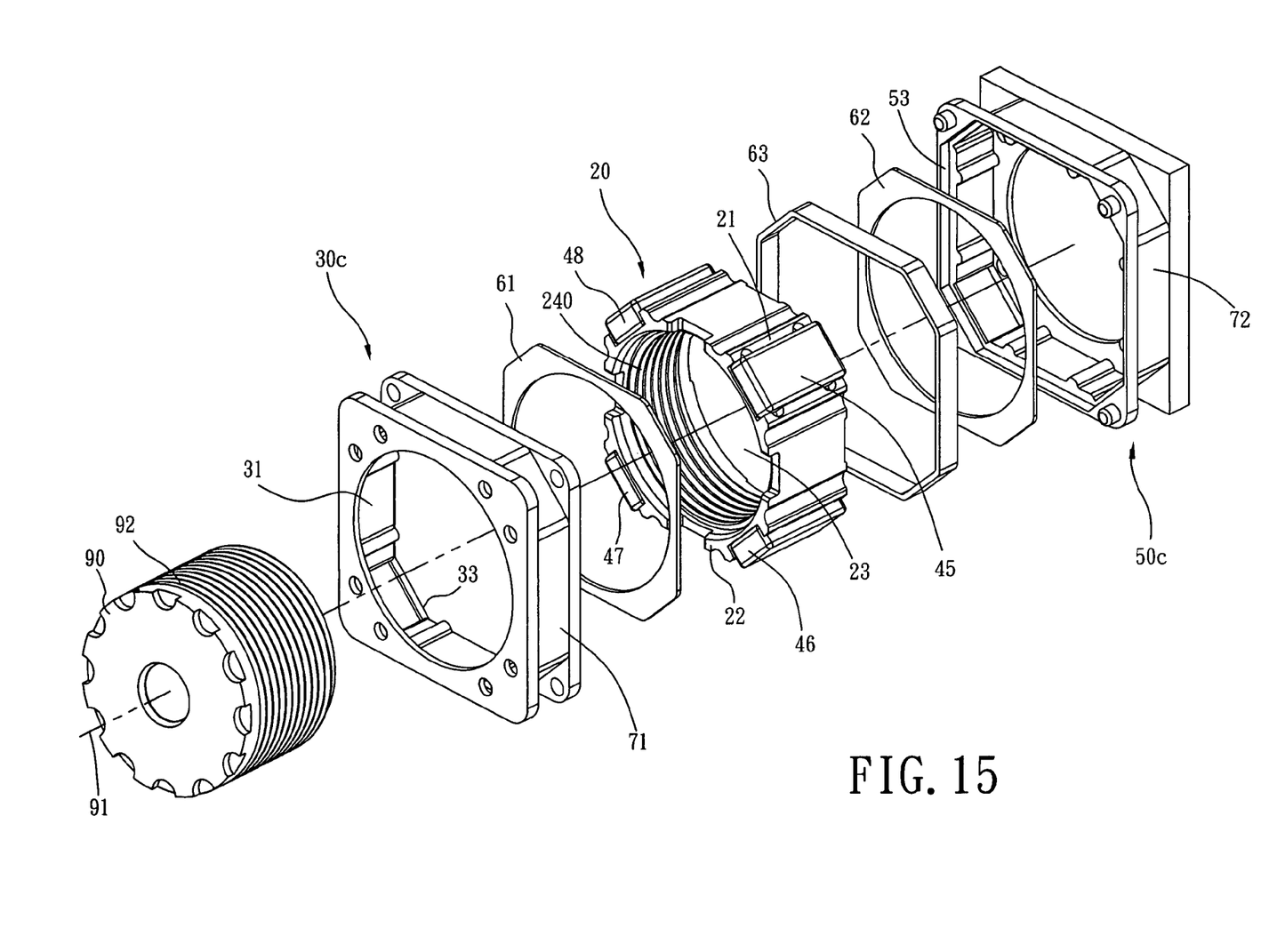
FIG. 15 is an exploded front side view of the multi-stage lens driving device according to the fourth embodiment of the invention.

FIG. 14 and FIG. 15 show respectively an assembled external view and an exploded front side view of the multi-stage lens driving device according to the fourth embodiment of the invention. Because most components of the fourth embodiment shown in FIG. 14 and FIG. 15 are substantially the same or similar with the ones shown in FIG. 2, therefore, same or similar components will not be described in the following description.

Figure 16:
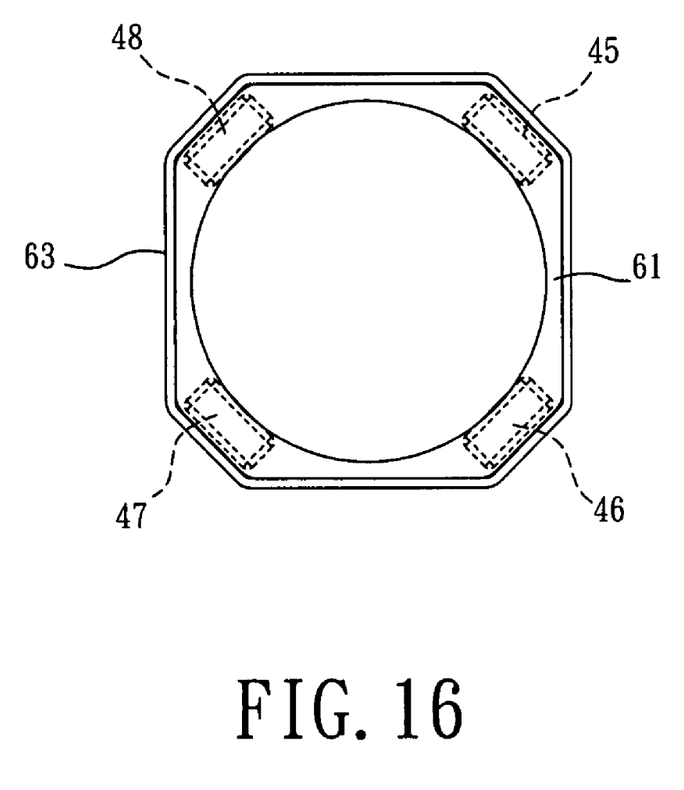
FIG. 16 is a diagram showing the relative positions of yoke and magnet in the multi-stage lens driving device according to the fourth embodiment of the invention.
Figure 17:
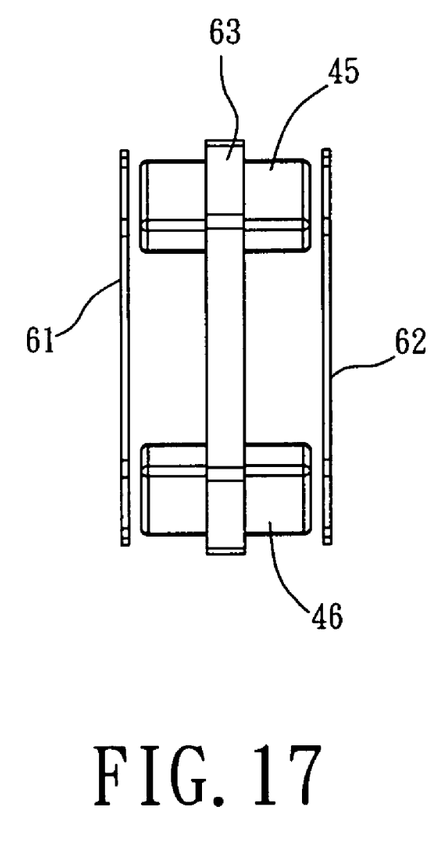
FIG. 17 is a diagram of the relative positions shown in FIG. 16 from a side view.

Referring to FIG. 14 and FIG. 15, and together with FIG. 16 and FIG. 17, the difference between this fourth embodiment and the aforementioned first embodiment is that, in addition to the magnetic conductors 61, 62 respectively disposed at the front and rear sides of the holder 20, the lens driving device of this fourth embodiment further comprises a frame-typed magnetic conductor 63 located at the middle between the magnetic conductors 61, 62. As shown in FIGS. 15 to 17, one of the magnetic conductors 61 (yoke) is mounted on the inner periphery at the anterior side of carriage 30c facing the holder 20 such that the magnetic conductor 61 (yoke) is essentially situated at the anterior side of holder 20 (the first position) along axial direction 91. Another magnetic conductor 62 (yoke) is mounted on the inner periphery of base 50c facing the holder 20, i.e. the posterior side of holder 20 along axial direction 91 (the second position). The newly added frame-typed magnetic conductor 63 is mounted between the positioning recesses 33, 53 respectively formed on the contact surfaces of carriage 30c and base 50c. The frame-typed magnetic conductor 63 substantially surrounds (but doesn't contact) the magnets 45~48 and is essentially situated at the middle of holder 20 (the third position) along axial direction 91.

Figure 18:
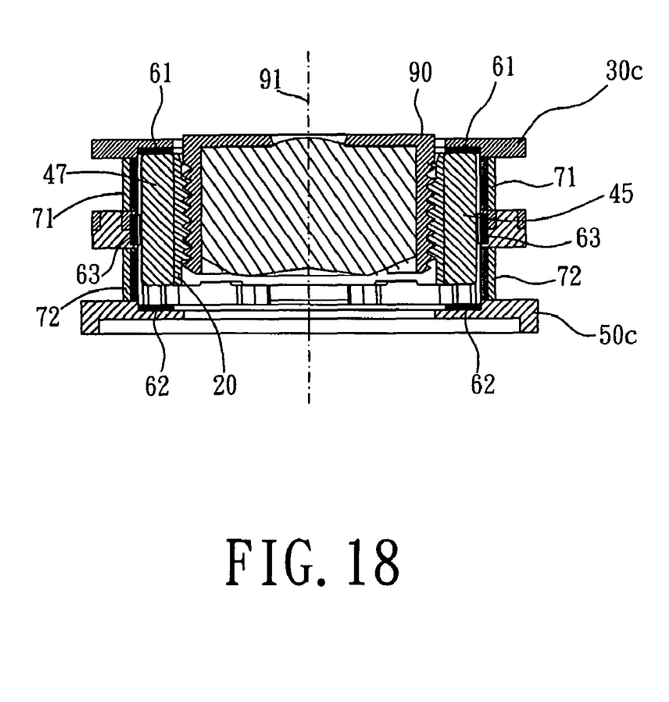
FIG. 18 is the B-B sectional view of the multi-stage lens driving device shown in FIG. 14 with the lens at a first position.

As shown in FIG. 18 together with FIG. 17, when holder 20 is driven by the electromagnetic driving mechanism (including magnets 45~48 and coils 71 and 72) to move to a place near the magnetic conductor 61 at anterior end, the magnets 45~48 disposed on the holder 20 will be attracted and positioned at the first position where magnetic conductor 61 at anterior end of holder 20 is located.

Figure 19:
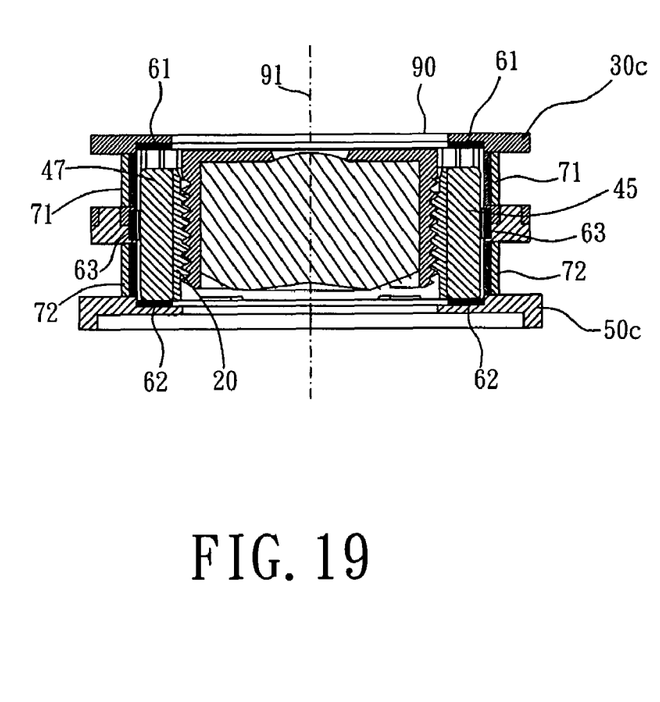
FIG. 19 is the B-B sectional view of the multi-stage lens driving device shown in FIG. 14 with the lens at a second position.

As shown in FIG. 19 together with FIG. 17, when current of opposite direction is applied to coils 71 and 72, the holder 20 is driven by inverse thrust force and moves to a place near the magnetic conductor 62 at the posterior end. As magnets 45~48 are attracted by magnetic conductor 62, the holder 20 is positioned at the second position at posterior end.

Figure 20:
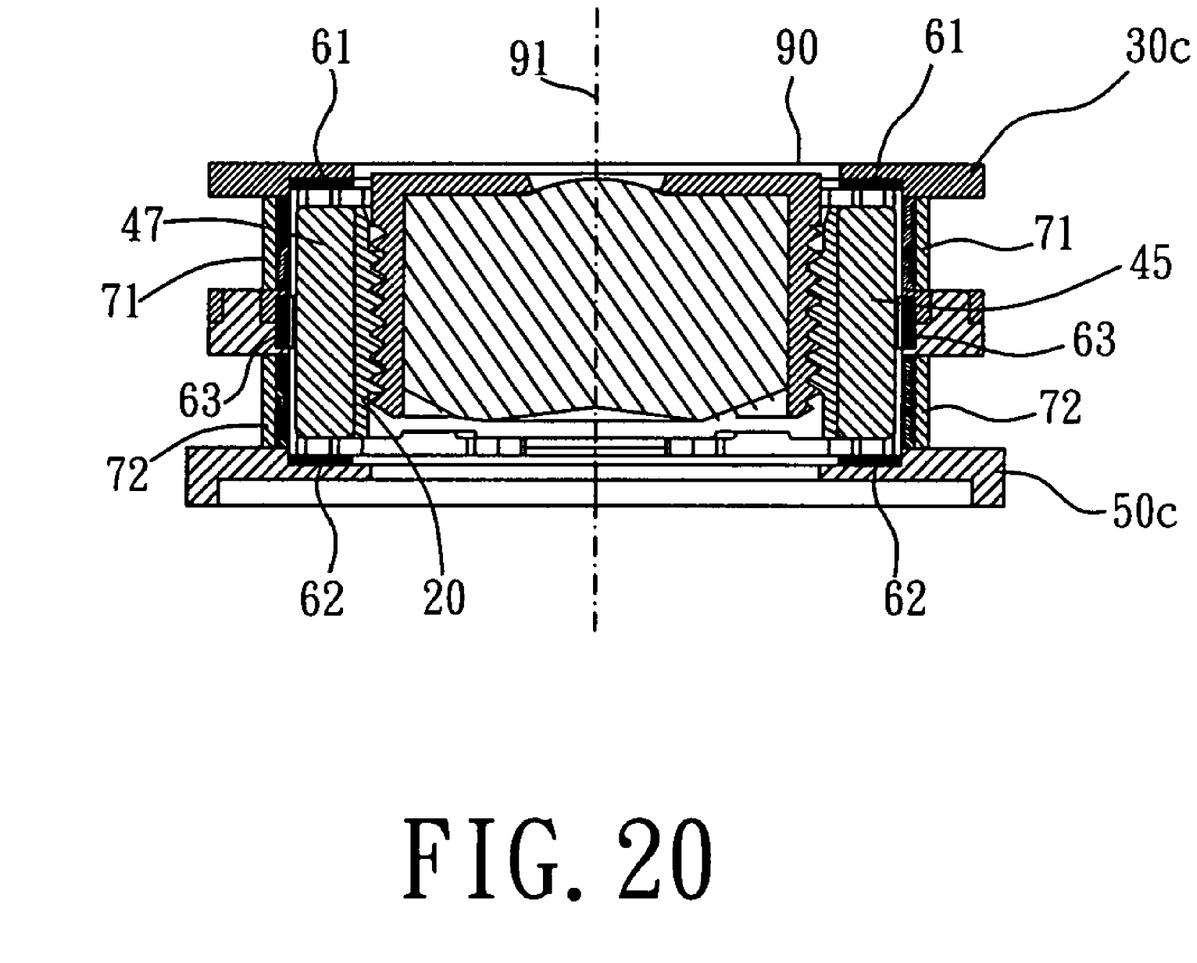
FIG. 20 is the B-B sectional view of the multi-stage lens driving device shown in FIG. 14 with the lens at a third position.

As shown in FIG. 20 together with FIG. 17, when directions of current applied to coils 71 and 72 are opposite to each other, the coil 71 will generate a force pushing the holder 20 backward (downward), while the other coil 72 will generate another force to push the holder 20 forward (upward). As a result, the magnets 45~48 will be attracted by frame-typed magnetic conductor 63 located at the middle between the other two magnetic conductors 61 and 62, so as to increase an additional switching position. As such, "three-stage" switching of lens position is achieved. In addition, through the attraction between magnetic conductors 61, 62 and 63 and magnets 45~48, the lens 90 is firmly secured to its place even with the current applied to coils 71 and 72 shut off, thereby saving the power consumption.

Figure 21:
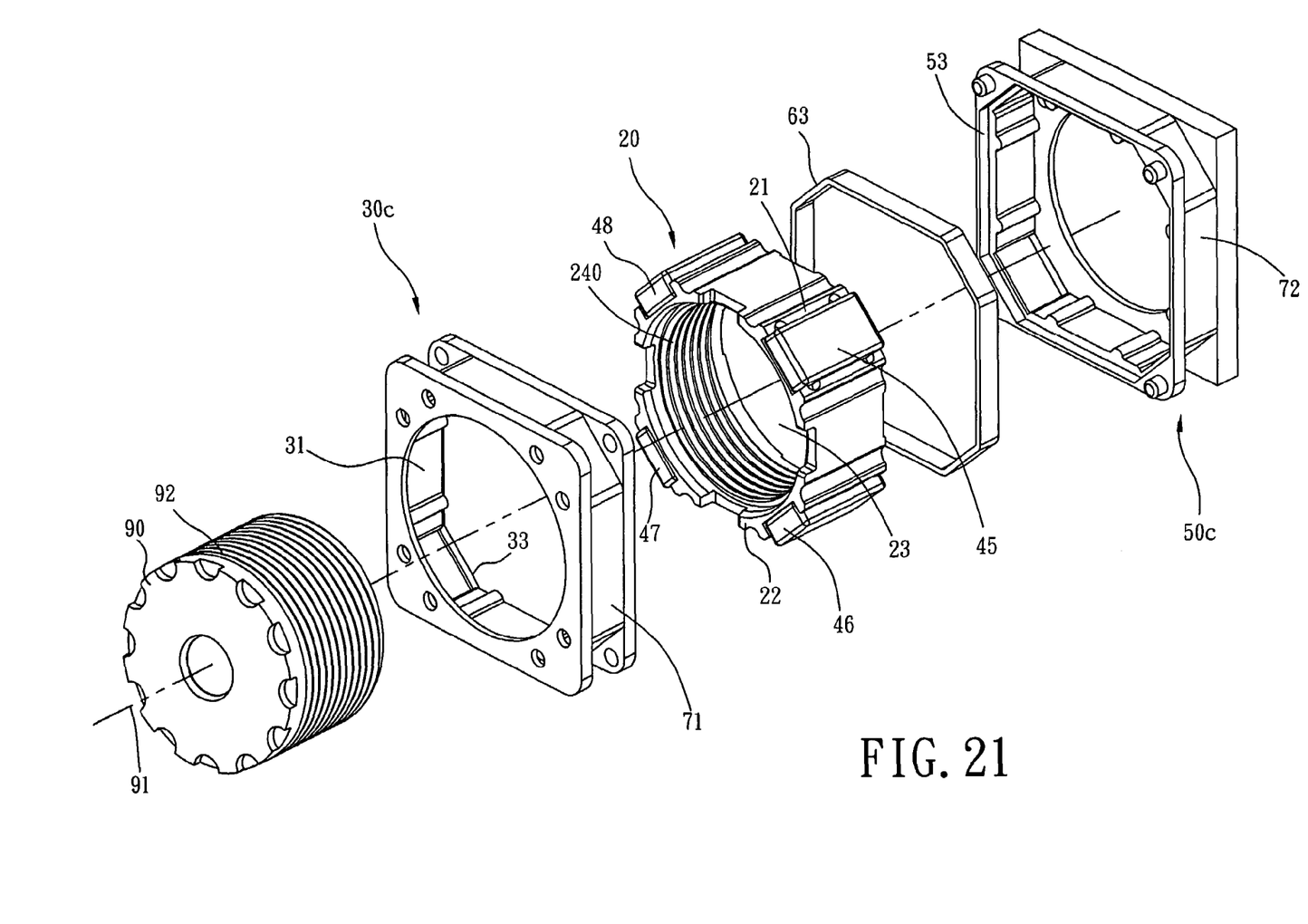
FIG. 21 is an exploded front side view of the multi-stage lens driving device according to the fifth embodiment of the invention.

FIG. 21 shows an exploded front side view of the multi-stage lens driving device according to the fifth embodiment of the invention. Because most components of the fifth embodiment shown in FIG. 21 are substantially the same with the ones shown in FIG. 15, therefore, same or similar components will not be described in the following description.

Referring to FIG. 21, the difference between this fifth embodiment and the aforementioned fourth embodiment is that, there is only one magnetic conductor 63 furnished, while the other two magnetic conductors are omitted in this fifth embodiment. The magnetic conductor 63 (yoke) is still mounted between the positioning recesses 33, 53 respectively formed on the contact surfaces of carriage 30c and base 50c, and thus can still provides "three-stage" switching of lens position. However, when the current applied to coils 71 and 72 shut off, the holder will be attracted by the magnetic conductor 63 and be moved to the middle position along the axial direction 91.

The fifth embodiment shown in FIG. 21 discloses a multi-stage lens driving device of the present invention that is furnished with "single" magnetic conductor 63. However, it is notable that, such "single" magnetic. conductor can also be located at either the anterior side of holder 20 (same location as the magnetic conductor 61) or the posterior side of holder 20 (same location as the magnetic conductor 62).

It should be noted that the above described embodiments are not to be construed as limiting the applicable scope of the invention, but instead the protective scope of the invention should be defined by the technical spirit of the appended claims along with their full scope of equivalents. In other words, equivalents and modifications made based on the appended claims still accords with the intention of the invention and dose not depart from the spirit and scope of the invention. Thus, all should be regarded as further implementions of the invention.

What is claimed is:

1. A multi-stage lens driving device, comprising: a holder for carrying a lens and the lens being defined with an axial direction; a carriage for receiving the holder in a manner that the holder is moveable relative to the carriage and linearly along the axial direction; an electromagnetic driving mechanism comprising at least one coil and at least one magnet, the coil and the magnet being opposing each other without direct contact, wherein either the coil or the magnet is disposed on the holder, while the other is disposed on the carriage, and wherein interacting force between the coil and the magnet is generated by applying current of predetermined direction on the coil so as to push the holder to move; and a positioning mechanism disposed on the carriage for maintaining the holder at a predefined position even when no current is applied to the coil, wherein said holder has a hollow annular structure with an outer ring surface, the magnet is coupled to the outer ring surface, whereas the coil is coupled to the carriage and corresponds to the location of the magnet, wherein the magnet is produced by polarizing a lodestone such that the upper and lower portions of the lodestone on the same side have opposite polarity, and as such, the upper and lower portions of magnet on the side facing the carriage have opposite polarity, wherein an outer edge contour of said holder is substantially a polygonal structure and an axial through-hole is configured at the center of holder to hold the lens, and said at least one magnet includes several magnets which are spaced in roughly equal distance apart and mounted on the outer ring surface of holder; said carriage has a hollow structure and the polygonal inner edge contour corresponds to the polygonal outer edge contour of holder; the matching of the inner and outer polygonal contours form essentially a guiding mechanism that allows the holder to engage only in linear displacement inside the carriage without turning.

2. The multi-stage lens driving device according to claim 1, wherein said coil is a flat coil which further comprises a substrate made of dielectric material and a metal coil printed thereon; the substrate is a rectangular sheet and the metal coil is spirally formed on a surface of substrate in the shape of a rectangular vortex.

3. The multi-stage lens driving device according to claim 1, wherein said coil comprises at least two inductive coils wound respectively around the outer periphery of carriage and corresponding respectively to the upper and lower portions of magnet; at the same time, the currents applied to the two inductive coils are in opposite direction.

4. The multi-stage lens driving device according to claim 1, wherein said positioning mechanism further comprises at least one magnetic conductor furnished on the carriage at a location corresponding to the predefined position; wherein, when the holder is driven by the electromagnetic driving mechanism to a place near the magnetic conductor, the magnet mounted on the holder is attracted by the magnetic conductor and secured at its position.

5. The multi-stage lens driving device according to claim 1, wherein said positioning mechanism further comprising two cone-shape inclined planes respectively situated at an anterior and a posterior periphery of holder along axial direction, and two beveled surfaces disposed respectively on carriage and corresponding respectively to the two cone-shape inclined planes; when holder is driven to move along axial direction, the beveled surfaces disposed on carriage can prop against the cone-shape inclined planes on holder to achieve the positioning effect, and further, the support of the cone-shape inclined planes on holder and the beveled surfaces on carriage for each other allows the center line of lens to overlap the axial direction so lens will not shift.

6. The multi-stage lens driving device according to claim 1, wherein said at least one coil is composed of only one inductive coil wound around the outer periphery of carriage in a predetermined direction; said magnet is a lodestone with polarity on the side surface facing the carriage opposite to the polarity on the side surface adjoining the outer ring surface of holder.

7. A multi-stage lens driving device, comprising: a holder for carrying a lens and the lens being defined with an axial direction; a carriage allowing the holder to be disposed therein and enabling the holder to carry out linear displacement therein along the axial direction; at least one magnet coupled to an outer ring surface of holder; and at least one coil coupled to the carriage and corresponding to the location of the magnet; by applying current of predefined direction to the coil, interacting force is produced between the coil and the magnet in order to push the holder to move; wherein said magnet is produced by polarizing a lodestone such that the upper and lower portions of the lodestone on the same side have opposite polarity, and as such, the upper and lower portions of magnet on the side facing the carriage have opposite polarity, wherein an outer edge contour of said holder exhibits a polygonal structure and an axial through-hole is configured at the center of holder to hold the lens, and said at least one magnet includes several magnets which are spaced in roughly equal distance apart and mounted on the outer ring surface of holder; said carriage has a hollow structure and the polygonal inner edge contour of its axial projection corresponds to the polygonal outer edge contour of holder; the matching of the inner and outer polygonal contours form essentially a guiding mechanism that allows the holder to engage only in linear displacement inside the carriage without turning.

8. The multi-stage lens driving device according to claim 7, wherein said coil is a flat coil which further comprises a substrate made of dielectric material and a metal coil printed thereon; the substrate is a rectangular sheet and the metal coil is spirally formed on a surface of substrate in the shape of a rectangular vortex.

9. The multi-stage lens driving device according to claim 7, wherein said at least one coil comprises at least two inductive coils wound respectively around the outer periphery of carriage and corresponding respectively to the upper and lower portions of magnet; at the same time, the currents applied to the two inductive coils are in opposite direction.

10. The multi-stage lens driving device according to claim 7, wherein said multi-stage lens driving device further comprises a positioning mechanism which includes at least one magnetic conductor furnished on the carriage at a predefined position; when the holder is driven by the electromagnetic driving mechanism to a place near the magnetic conductor, the magnet mounted on the holder is attracted by the magnetic conductor and maintained at that position.

11. The multi-stage lens driving device according to claim 10, wherein said positioning mechanism further comprising two cone-shape inclined planes situated at an anterior and a posterior periphery of holder along axial direction, and two beveled surfaces disposed respectively on carriage and corresponding respectively to the two cone-shape inclined planes; when holder is driven to move along axial direction, the beveled surfaces disposed on carriage can prop against the cone-shape inclined planes on holder to achieve the positioning effect, and further, the support of the cone-shape inclined planes on holder and the beveled surfaces on carriage for each other allows the center line of lens to overlap the axial direction so lens will not shift.

12. A multi-stage lens driving device, comprising: a holder for carrying a lens and the lens being defined with an axial direction; a carriage allowing the holder to be disposed therein and enabling the holder to carry out linear displacement therein along the axial direction; an electromagnetic driving mechanism comprising at least one magnet disposed on the holder and at least one coil disposed on the carriage; and a positioning mechanism comprising at least one magnetic conductor disposed on the carriage, the magnet mounted on the holder will be attracted by a nearby magnetic conductor and secured at its position when no current is applied to the coil, wherein an outer edge contour of said holder exhibits a polygonal structure and an axial through-hole is configured at the center of holder to hold the lens, and said at least one magnet includes several magnets which are spaced in roughly equal distance apart and mounted on the outer ring surface of holder; said carriage has a hollow structure and the polygonal inner edge contour of its axial projection corresponds to the polygonal outer edge contour of holder; the matching of the inner and outer polygonal contours form essentially a guiding mechanism that allows the holder to engage only in linear displacement inside the carriage without turning.

13. The multi-stage lens driving device according to claim 12, wherein said positioning mechanism further comprising two cone-shape inclined planes situated at an anterior and a posterior periphery of holder along axial direction, and two beveled surfaces disposed respectively on carriage and corresponding respectively to the two cone-shape inclined planes; when holder is driven to move along axial direction, the beveled surfaces disposed on carriage can prop against the cone-shape inclined planes on holder to achieve the positioning effect, and further, the support of the cone-shape inclined planes on holder and the beveled surfaces on carriage for each other allows the center line of lens to overlap the axial direction so lens will not shift.

14. The multi-stage lens driving device according to claim 12, wherein the magnet is produced by polarizing a lodestone such that the upper and lower portions of the lodestone on the same side have opposite polarity, and as such, the upper and lower portions of magnet on the side facing the carriage have opposite polarity.

15. The multi-stage lens driving device according to claim 12, wherein said coil is a flat coil which further comprises a substrate made of dielectric material and a metal coil printed thereon; the substrate is a rectangular sheet and the metal coil is spirally wound on a surface of substrate in the shape of a rectangular vortex.

\* \* \* \* \*